(12) United States Patent
Moberg et al.

(10) Patent No.: US 7,610,405 B1
(45) Date of Patent: *Oct. 27, 2009

(54) ROUTER SOFTWARE UPGRADE EMPLOYING REDUNDANT PROCESSORS

(75) Inventors: Kenneth Moberg, Boulder Creek, CA (US); Ronnie Kon, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1103 days.

This patent is subject to a terminal disclaimer.

(21) Appl. No.: 10/825,850

(22) Filed: Apr. 16, 2004

Related U.S. Application Data

(63) Continuation of application No. 09/512,990, filed on Feb. 24, 2000, now Pat. No. 6,738,826.

(51) Int. Cl.
*G06F 15/173* (2006.01)

(52) U.S. Cl. ............... 709/242; 370/216; 370/219; 370/220; 370/221; 370/225; 714/11; 714/13; 700/82

(58) Field of Classification Search ........... 709/242; 370/216, 219–221, 225; 714/11, 13; 700/82
See application file for complete search history.

(56) References Cited

U.S. PATENT DOCUMENTS

| 5,089,958 | A | 2/1992 | Horton et al. | 395/575 |
|---|---|---|---|---|
| 5,136,498 | A | 8/1992 | McLaughlin et al. | 700/79 |
| 5,157,663 | A | 10/1992 | Major et al. | 714/10 |
| 5,473,599 | A | 12/1995 | Li et al. | 370/16 |
| 5,590,724 | A | 1/1997 | Verdgikovsky | 175/57 |
| 5,815,668 | A | 9/1998 | Hashimoto | 395/200.68 |
| 5,870,557 | A | 2/1999 | Bellovin et al. | 395/200.54 |
| 5,914,953 | A | 6/1999 | Krause et al. | 370/392 |
| 5,919,266 | A | 7/1999 | Sud et al. | 714/13 |
| 5,963,448 | A | 10/1999 | Flood et al. | 700/82 |
| 6,118,768 | A | 9/2000 | Bhatia et al. | 370/254 |
| 6,229,787 | B1 | 5/2001 | Byrne | 370/218 |
| 6,236,999 | B1 | 5/2001 | Jacobs et al. | 707/10 |
| 6,263,452 | B1 | 7/2001 | Jewett et al. | 704/9 |
| 6,285,656 | B1 | 9/2001 | Chaganty et al. | 270/228 |
| 6,286,048 | B1 | 9/2001 | Moberg | 709/225 |
| 6,389,555 | B2 | 5/2002 | Purcell et al. | 714/10 |
| 6,397,385 | B1 | 5/2002 | Kravitz | 717/173 |
| 6,457,138 | B1 | 9/2002 | Lesser et al. | 714/1 |
| 6,460,146 | B1 | 10/2002 | Moberg et al. | 714/10 |
| 6,490,246 | B2 | 12/2002 | Fukushima et al. | 370/220 |

OTHER PUBLICATIONS

U.S. Appl. No. 09/205,577, Moberg et al.
U.S. Appl. No. 09/205,554, Moberg.
Jack Jenney, "Dual RSP—High System Availability SW Functional Spec", Oct. 6, 1995, Cisco Systems, Inc.

*Primary Examiner*—Alina N. Boutah
(74) *Attorney, Agent, or Firm*—Cindy Kaplan

(57) ABSTRACT

Systems and methods for replacing software controlling active routers while minimizing impact on network operation are provided by virtue of one embodiment of the present invention. The software replacement process takes advantage of packet processor redundancy. An active packet switching device to be reprogrammed is de-activated and a redundant packet switching device takes over. The no longer active packet switching device is reprogrammed before being reactivated.

38 Claims, 3 Drawing Sheets

ROUTER SOFTWARE UPGRADE EMPLOYING REDUNDANT PROCESSORS

STATEMENT OF RELATED APPLICATIONS

The present invention is a continuation of U.S. patent application Ser. No. 09/512,990, filed Feb. 24, 2000, and related to the subject matter of U.S. patent application Ser. No. 09/205,577, filed on Dec. 4, 1998 and U.S. patent application Ser. No. 09/205,554, filed on Dec. 4, 1998. The contents of each applications are herein incorporated by reference for all purposes in their entirety.

BACKGROUND OF THE INVENTION

The present invention relates to computer networks and more particularly to systems and methods for upgrading packet processing software without interfering with packet flow.

Routers are internetworking devices that are typically used to connect similar and heterogeneous network segments into internetworks. A typical router includes various interfaces that send and receive packets. The router receives a given packet through a first interface, processes the packet to determine how to best forward the packet to its destination, and then based on this determination transmits the packet through a selected second interface.

In a high speed data communication network, a router will handle a very large and continuous flow of packets. Any sustained interruption of router operation may adversely affect network performance due to increased latency or even loss of packets.

Many popular types of routers operate under the control of packet processing software. The packet processing software directly manipulates the individual packets to be forwarded by the router. As with any software controlled device, it is sometimes desirable or necessary to replace or upgrade the software. A problem arises in that changing software requires halting packet processing because it is the software that directly manipulates the packet. Systems and methods for replacing router software while minimizing impact on network operation are needed.

SUMMARY OF THE INVENTION

Systems and methods for replacing software controlling active routers while minimizing impact on network operation are provided by virtue of one embodiment of the present invention. The software replacement process takes advantage of packet processor redundancy. In one embodiment, an active packet switching device to be reprogrammed is de-activated and a redundant packet switching device takes over. The no longer active packet switching device is reprogrammed before being reactivated.

A first aspect of the present invention provides a computer-implemented method for replacing an active packet switching device without interfering with packet flow. The method includes receiving a failover message at a currently active packet switching device (A), transferring protocol state information from the packet switching device (A) to a currently inactive packet switching device (B), de-activating the packet switching device (A) and activating the packet switching device (B).

A second aspect of the present invention provides a computer-implemented method for reprogramming an active packet switching device without interfering with packet flow. The method includes: de-activating a current packet switching device (A) and activating a standby packet switching device (B) to handle packet flow previously handled by the packet switching device (A), thereafter reprogramming the packet switching device (A), and thereafter de-activating the packet switching device (B) and re-activating the packet switching device (A).

A further understanding of the nature and advantages of the inventions herein may be realized by reference to the remaining portions of the specification and the attached drawings.

DESCRIPTION OF SPECIFIC EMBODIMENTS

One embodiment of the present invention is directed toward upgrading packet processing software while minimizing or eliminating any interruptions in the handling of packets. This is preferably done by providing at least two independent packet processors with access to the same interfaces so that while one packet processor is being upgraded, the other packet processor can take over packet processing operations. The handoff between packet processors is fast and transparent to overall network operation.

Generally, the packet processing software management techniques of the present invention may be implemented in software and/or hardware. For example, they can be implemented in an operating system kernel, in separate user processes, in a library package bound into network applications, on a specially constructed machine, or on a network interface card. In a specific embodiment of this invention, these techniques may be implemented in software such as an operating system or in an application running on an operating system.

A software or software/hardware hybrid packet processing management system of this invention is preferably implemented on a general-purpose programmable machine selectively activated or reconfigured by a computer program stored in memory. Such a programmable machine may be a network device designed to handle network traffic. Such network devices typically have multiple network interfaces including frame relay and ISDN interfaces, for example. Specific examples of such network devices include routers and switches. For example, the packet processing management systems of this invention may operate on specially configured routers such as those available from Cisco Systems, Inc. of San Jose, Calif. A general architecture for some of these machines will appear from the description given below. In an alternative embodiment, the packet processing management system may be implemented on a general-purpose network host machine such as a personal computer or workstation adapted to interface with computer networks.

Figure 1:
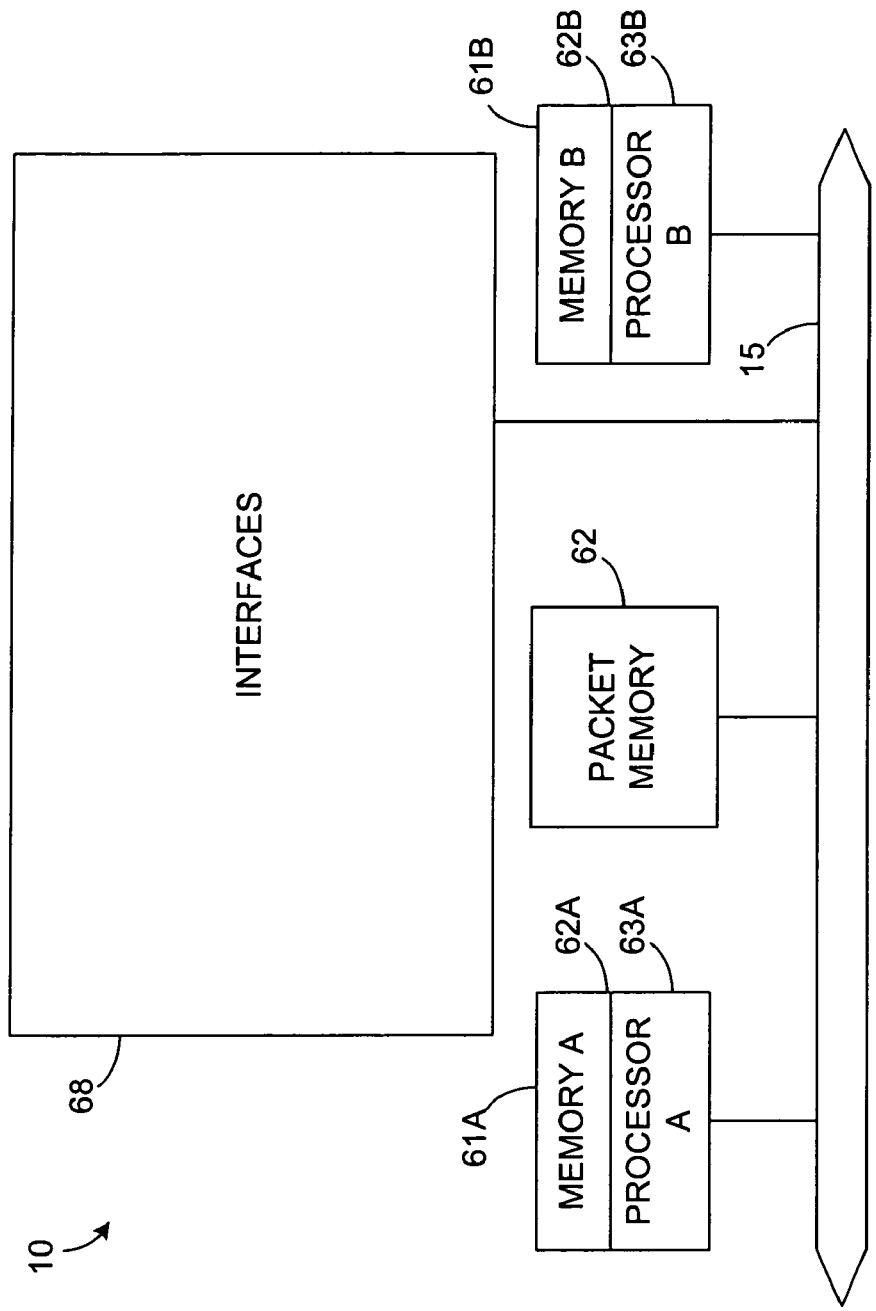
FIG. 1 depicts a router including redundant packet processing capabilities according to one embodiment of the present invention.

Referring now to FIG. 1, a router 10 suitable for implementing the present invention includes interfaces 68, and a bus 15 (e.g., a PCI bus). Router 10 incorporates redundant packet processing capabilities and therefore includes two CPUs 61A and 61B. As shown, CPU 61A includes a memory 62A and a processor 63A. Similarly, CPU 61B includes a memory 62B and a processor 63B. At any one time, one of CPU 61A and CPU 61B is the "primary" packet processor responsible for handling and forwarding newly received packets. When acting under the control of appropriate software or firmware, CPUs 61A and 61B are responsible for such router tasks as routing table computations, network management, and general processing of packets. It preferably accomplishes all these functions under the control of software including an operating system (e.g., a version of the Internetwork Operating System (IOS®) of Cisco Systems, Inc.) and any appropriate applications software. Processors 63A and 63B may be, e.g., microprocessors of the Motorola family or microprocessors of the MIPS family of microprocessors. In an alternative embodiment, processors 63A and 63B are specially designed hardware for controlling the operations of router 10. Memories 62A and 62B can be non-volatile RAM and/or ROM. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processor may control such communications intensive tasks as packet switching, media control, and management. By providing separate processors for the communications intensive tasks, these interfaces allow the CPUs 61A and 61B to efficiently perform routing computations, network diagnostics, security functions, etc. Router 10 may further include a packet memory 72 for intermediate storage of packets being forwarded by router 10.

Although the system shown in FIG. 1 is one specific router of the present invention, it is by no means the only architecture on which the present invention can be implemented. For example, an architecture having a single processor that handles communications as well as routing computations, etc. is often used. Further, other types of interfaces and media could also be used with the router.

Regardless of a network device's configuration, it may employ one or more memories or memory modules (including memories 62A and 62B) configured to store program instructions for the general-purpose network operations and packet processing and management functions described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 2:
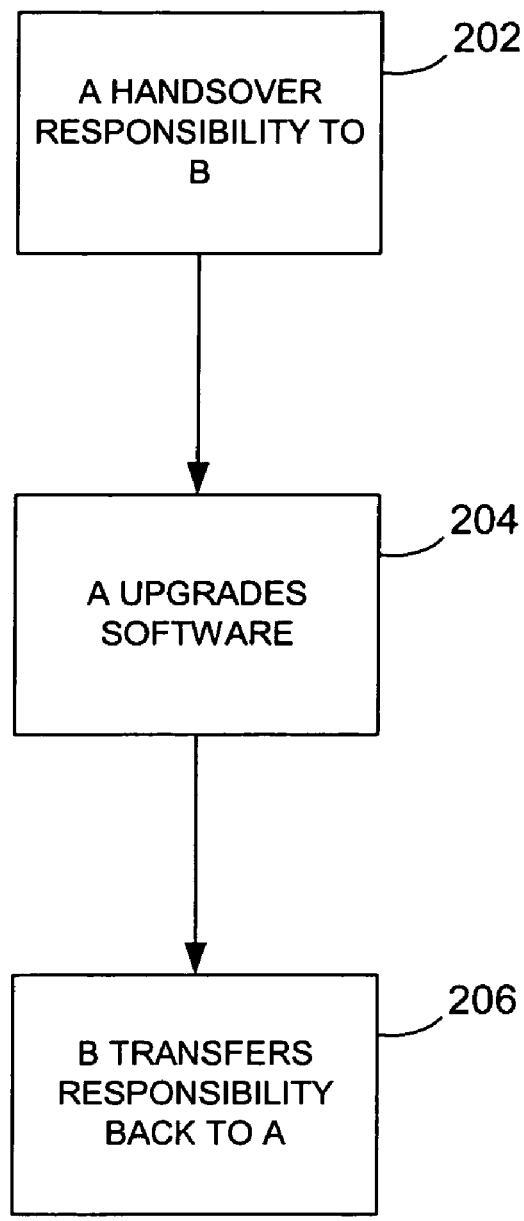
FIG. 2 depicts a top level flowchart describing steps of upgrading packet processing software according to one embodiment of the present invention.

FIG. 2 is a flowchart generally describing steps of upgrading packet processing software in a system such as router 10 that employs redundant CPUs for performing packet processing operations. It is desired to upgrade the packet processing software of CPU 61A. It is assumed that CPU 61A is currently the primary processor and is handling packets received via interfaces 68 and performing operations on packets stored in packet memory 72. CPU 61B is a secondary processor that is available as a reserve in the event of a failure by CPU 61A. At step 202, CPU 61A hands over current packet processing responsibility to CPU 61B so that CPU 61A is no longer the primary packet processor. Now, CPU 61B is the primary packet processor. CPU 61A is now a secondary processor. While CPU 61A is secondary processor, at step 204, its software may be upgraded by writing to memory 62A. Once the software of CPU 61A has been upgraded, it can again assume primary responsibility for processing packets. CPU 61B transfers responsibility back to CPU 61A at step 206 so that CPU 61A is again the primary processor and CPU 63B is the secondary processor. CPU 61A then resumes processing packets using its new software. According to the present invention, an entire upgrading operation may be accomplished without any dropped packets as will be explained below. In an alternative embodiment, CPU 61B is upgraded to new software before the transfer of responsibility while it is operating as the secondary processor.

Figure 3:
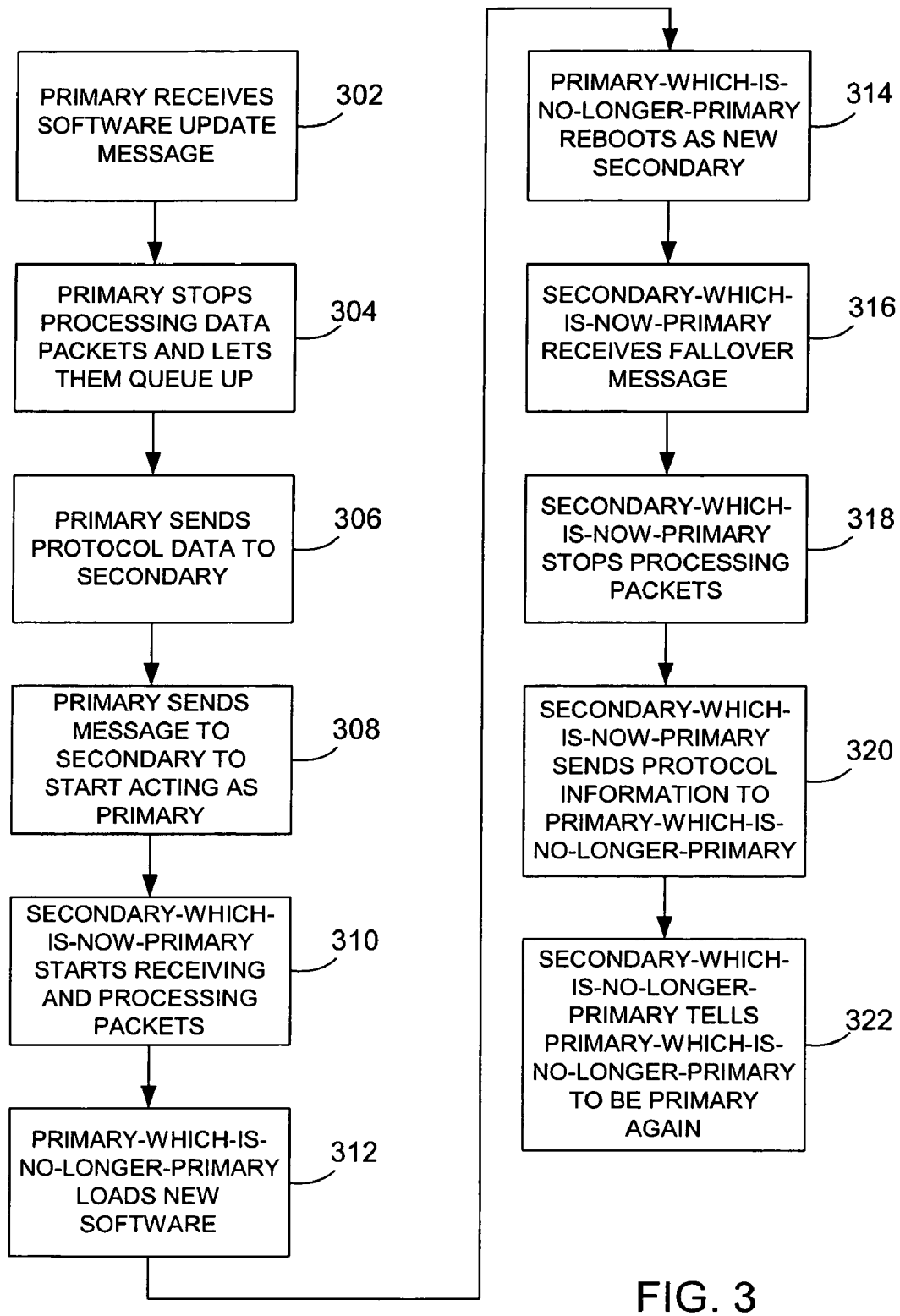
FIG. 3 depicts a detailed flowchart describing steps of upgrading packet processing software according to one embodiment of the present invention.

FIG. 3 is a flowchart describing detailed steps of upgrading packet processing software according to one embodiment of the present invention. At step 302, CPU 61A which is now the primary packet processor receives a remotely generated message telling it to upgrade its software. The message may be generated at a remote network management workstation. The message may include a URL indicating the location of the new software to download and install. CPU 61A, in response, begins a failover process to shift packet processing responsibility to CPU 61B. This process is similar to what would be followed in the event of a failure by CPU 61A.

At step 304, CPU 61A stops processing new data packets and allows them to queue up within packet memory 72. At step 306, CPU 61A sends protocol data to CPU 61B to facilitate the handover. The protocol information to be transferred may include, e.g., routing tables, negotiated state information including information as to which links are being ignored because of spanning tree negotiation, authorization status for remote point to point links, and other learned routing state information, etc. There are various ways that the protocol data may be passed between CPUs 61A and 61B. For example, there may be a dedicated serial port connection between the CPUs. Alternatively, CPU 61A may place the protocol data in a packet buffer within packet memory 72 that CPU 61B can then read. Once the protocol data has been passed, CPU 61A sends a further message to CPU 61B telling CPU 61B to begin acting as the primary packet processor at step 308. At step 310, CPU 61B begins receiving and processing packets.

At step 312, CPU 61A loads new software from the location specified in the software update message of step 302. The new software may be, for example, a new version of IOS. At step 314, CPU 61A begins operating as the secondary packet processor. CPU 61A can become the secondary packet processor by rebooting as a secondary for example. Operations then may continue for some time with CPU 61B operating as the primary packet processor and CPU 61A operating as a secondary packet processor.

In order to resume primary operations at CPU 61A with the new software, a failover message is received at CPU 61B from any network node at step 316. At step 318, CPU 61B stops processing new packets. Then at step 320, CPU 61B sends the necessary protocol information back to CPU 61A as was done at step 306. Then, at step 322 CPU 61B sends a message to CPU 61A directing CPU 61A to resume operation as primary packet processor. CPU 61B can then begin running as secondary or reboot to be the secondary packet processor.

Each protocol operating on CPU 61A may send its own data message to its corresponding protocol entity on CPU 61B. In this way, the protocols may operate uninterrupted around the failover. The handovers should preferably occur within 1 or 2 seconds to avoid dropping packets.

It is understood that the examples and embodiments described herein are for illustrative purposes only and that various modifications and changes in light thereof will be suggested to persons skilled in the art and are to be included in the spirit and purview of this application and scope of the appended claims and their full scope of equivalents. All publications, patents, and patent applications cited herein are hereby incorporated by reference.

The invention claimed is:

1. A computer-implemented method for reprogramming an active packet switching router without interfering with packet flow, said method comprising:
   receiving a software upgrade message at a currently active packet switching device (A);
   halting receipt of new packets at said packet switching device (A) upon receipt of said software upgrade message;
   transferring protocol state information, including routing tables, negotiated state information, authorization status and learned routing state information, from said packet switching device (A) to a currently inactive packet switching device (B);
   reprogramming said packet switching device (B);
   sending a message requesting activation from said packet switching device (A) to said packet switching device (B);
   de-activating said packet switching device (A) and activating said reprogrammed packet switching device (B) to handle packet flow previously handled by said packet switching device (A), including beginning receipt of new packets at said packet switching device (B);
   reprogramming said packet switching device (A), including retrieving new packet processing software from a remote location; and thereafter
   de-activating said packet switching device (B) and re-activating said packet switching device (A).

2. The method of claim 1 wherein reprogramming said packet switching device (B) comprises retrieving new packet processing software from a remote location.

3. The method of claim 1 wherein said protocol state information comprises register values.

4. The method of claim 1 further comprising:
   operating said packet switching device (A) as a back-up after de-activating said packet switching device (A).

5. A computer-implemented method for reprogramming an active packet switching router without interfering with packet flow, said method comprising:
   receiving a software upgrade message at a currently active packet switching device (A);
   halting receipt of new packets at said packet switching device (A) upon receipt of said software upgrade message;
   transferring protocol state information comprising register values including routing tables, negotiated state information, authorization status and learned routing state information, from said packet switching device (A) to a currently inactive packet switching device (B);
   sending a message requesting activation from said packet switching device (A) to said packet switching device (B);
   de-activating said packet switching device (A) and activating said reprogrammed packet switching device (B) to handle packet flow previously handled by said packet switching device (A), including beginning receipt of new packets at said packet switching device (B);
   reprogramming said packet switching device (A), including retrieving new packet processing software from a remote location; and thereafter
   de-activating said packet switching device (B) and re-activating said packet switching device (A).

6. The method of claim 5 further comprising:
   reprogramming said packet switching device (B) prior to activating said packet switching device (B) including retrieving new packet processing software from a remote location.

7. The method of claim 5 further comprising:
   operating said packet switching device (A) as a back-up after de-activating said packet switching device (A).

8. A computer-readable storage medium encoded with a computer program that reprograms an active packet switching router without interfering with packet flow, said computer program comprising:
   code that receives a software upgrade message at a currently active packet switching device (A);
   code that halts receipt of new packets at said packet switching device (A) upon receipt of said software upgrade message;
   code that transfers protocol state information, including routing tables, negotiated state information, authorization status and learned routing state information, from said packet switching device (A) to a currently inactive packet switching device (B);
   code that sends a message requesting activation from said packet switching device (A) to said packet switching device (B);
   code that reprograms said packet switching device (B) before said packet switching device (B) is activated;
   code that de-activates said packet switching device (A) and activates said packet switching device (B) to handle packet flow previously handled by said packet switching device (A);
   code that reprograms said packet switching device (A) after de-activation, including code that retrieves new packet processing software from a remote location; and
   code that de-activates said packet switching device (B) and re-activates said packet switching device (A) after reprogramming.

9. The computer-readable storage medium of claim 8 wherein said code that reprograms said packet switching device (B) comprises code that retrieves new packet processing software from a remote location.

10. The computer-readable storage medium of claim 8 wherein said protocol state information comprises register values.

11. The computer-readable storage medium of claim 8 further comprising:
    code that operates said packet switching device (A) as a back-up after said packet switching device (A) is de-activated.

12. A computer-readable storage medium encoded with a computer program that reprograms an active packet switching router without interfering with packet flow, said computer program comprising:
- code that receives a software upgrade message at a currently active packet switching device (A);
- code that halts receipt of new packets at said packet switching device (A) upon receipt of said software upgrade message;
- code that transfers protocol state information comprising register values including routing tables, negotiated state information, authorization status and learned routing state information, from said packet switching device (A) to a currently inactive packet switching device (B);
- code that sends a message requesting activation from said packet switching device (A) to said packet switching device (B);
- code that de-activates said packet switching device (A) and activates said packet switching device (B) to handle packet flow previously handled by said packet switching device (A);
- code that reprograms said packet switching device (A) after de-activation, including code that retrieves new packet processing software from a remote location; and
- code that de-activates said packet switching device (B) and re-activates said packet switching device (A) after reprogramming.

13. The computer-readable storage medium of claim 12 further comprising:
- code that reprograms said packet switching device (B) before said packet switching device (B) is activated and further comprising code that retrieves new packet processing software from a remote location.

14. The computer-readable storage medium of claim 12 further comprising:
- code that operates said packet switching device (A) as a back-up after said packet switching device (A) is de-activated.

15. A packet switching system comprising:
- a currently active packet switching device (A);
- a packet switching device (B); and
- a memory system storing:
  - code that receives a software upgrade message at said packet switching device (A);
  - code that halts receipt of new packets at said packet switching device (A) upon receipt of said software upgrade message;
  - code that transfers protocol state information, including routing tables, negotiated state information, authorization status and learned routing state information, from said packet switching device (A) to said packet switching device (B);
  - code that sends a message requesting activation from said packet switching device (A) to said packet switching device (B);
  - code that reprograms said packet switching device (B) before said packet switching device (B) is activated;
  - code that de-activates said packet switching device (A) and activates said packet switching device (B) to handle packet flow previously handled by said packet switching device (A);
  - code that reprograms said packet switching device (A) after de-activation, including code that retrieves new packet processing software from a remote location; and
  - code that de-activates said packet switching device (B) and re-activates said packet switching device (A) after reprogramming.

16. The system of claim 15 wherein said code that reprograms said packet switching device (B) comprises code that retrieves new packet processing software from a remote location.

17. The system of claim 15 wherein said protocol state information comprises register values.

18. The system of claim 15 further comprising:
- code that operates said packet switching device (A) as a back-up after said packet switching device (A) is de-activated.

19. A packet switching system comprising:
- a currently active packet switching device (A);
- a packet switching device (B); and
- a memory system storing:
  - code that receives a software upgrade message at said packet switching device (A);
  - code that halts receipt of new packets at said packet switching device (A) upon receipt of said software upgrade message;
  - code that transfers protocol state information comprising register values including routing tables, negotiated state information, authorization status and learned routing state information, from said packet switching device (A) to said packet switching device (B);
  - code that sends a message requesting activation from said packet switching device (A) to said packet switching device (B);
  - code that de-activates said packet switching device (A) and activates said packet switching device (B) to handle packet flow previously handled by said packet switching device (A);
  - code that reprograms said packet switching device (A) after de-activation, including code that retrieves new packet processing software from a remote location; and
  - code that de-activates said packet switching device (B) and re-activates said packet switching device (A) after reprogramming.

20. The system of claim 19 further comprising:
code that reprograms said packet switching device (B) before said packet switching device (B) is activated and further comprising code that retrieves new packet processing software from a remote location.

21. The system of claim 19 further comprising:
code that operates said packet switching device (A) as a back-up after said packet switching device (A) is de-activated.

22. A packet switching system comprising:
- a currently active packet switching device (A);
- a currently inactive packet switching device (B); and
- a memory system storing:
  - code that receives a failover message at said currently active packet switching device (A);
  - code that then transfers protocol state information, including routing tables, negotiated state information, authorization status and learned routing state information, from said packet switching device (A) to said packet switching device (B);
  - code that reprograms said packet switching device (B) before said packet switching device (B) is activated;
  - code that de-activates said packet switching device (A), including code that sends a message requesting activation from said packet switching device (A) to said packet switching device (B) and code that halts receipt of new packets at said packet switching device (A) upon receipt of said failover message, and that activates said packet switching device (B), including code that begins receipt of new packets at said packet switching device (B);

code that reprograms said packet switching device (A) after said packet switching device (A) is de-activated, including code that retrieves new packet processing software from a remote location; and code that reprograms said packet switching device (B) before said packet switching device (B) is activated.

23. The system of claim 22 wherein said code that reprograms said packet switching device (B) comprises code that retrieves new packet processing software from a remote location.

24. The system of claim 22 wherein said protocol state information comprises register values.

25. The system of claim 22 further comprising:
code that operates said packet switching device (A) as a back-up after said packet switching device (A) is de-activated.

26. A packet switching system comprising:
a currently active packet switching device (A);
a packet switching device (B); and
a memory system storing:
 code that receives a software upgrade message at said packet switching device (A);
 code that halts receipt of new packets at said packet switching device (A) upon receipt of said software upgrade message;
 code that transfers protocol state information comprising register values including routing tables, negotiated state information, authorization status and learned routing state information, from said packet switching device (A) to said packet switching device (B);
 code that sends a message requesting activation from said packet switching device (A) to said packet switching device (B);
 code that de-activates said packet switching device (A) and activates said packet switching device (B) to handle packet flow previously handled by said packet switching device (A);
 code that reprograms said packet switching device (A) after de-activation, including code that retrieves new packet processing software from a remote location;
 code that de-activates said packet switching device (B) and re-activates said packet switching device (A) after reprogramming; and
 code that reprograms said packet switching device (B) before said packet switching device (B) is activated.

27. The system of claim 26 further comprising
code that reprograms said packet switching device (B) before said packet switching device (B) is activated and further comprising code that retrieves new packet processing software from a remote location.

28. The system of claim 26 further comprising:
code that operates said packet switching device (A) as a back-up after said packet switching device (A) is de-activated.

29. A packet switching router having a packet switching devices, said router comprising:
means for receiving a failover message at a currently active packet switching device (A);
means for then transferring protocol state information, including routing tables, negotiated state information, authorization status and learned routing state information, from said packet switching device (A) to a currently inactive packet switching device (B);
means for sending a message requesting activation from said packet switching device (A) to said packet switching device (B);
means for halting receipt of new packets at said packet switching device (A) upon receipt of said failover message;
means for de-activating said packet switching device (A) and activating said packet switching device (B), including beginning receipt of new packets at said packet switching device (B); and
means for reprogramming said packet switching device (A) after de-activating said packet switching device (A), including retrieving new packet processing software from a remote location.

30. The router of claim 29 further comprising:
means for reprogramming said packet switching device (B) prior to activating said packet switching device (B).

31. The router of claim 30 wherein reprogramming comprises retrieving new packet processing software from a remote location.

32. The router of claim 29 further comprising:
means for operating said packet switching device (A) as a back-up after de-activating said packet switching device (A).

33. The method of claim 29 wherein said protocol state information comprises register values.

34. A packet switching router with a plurality of packet switching devices, said router comprising:
means for receiving a software upgrade message at a currently active packet switching device (A);
means for halting receipt of new packets at said packet switching device (A) upon receipt of said software upgrade message;
means for transferring protocol state information, including routing tables, negotiated state information, authorization status and learned routing state information, from said packet switching device (A) to a currently inactive packet switching device (B);
means for sending a message requesting activation from said packet switching device (A) to said packet switching device (B);
means for de-activating said packet switching device (A) and activating said packet switching device (B) to handle packet flow previously handled by said packet switching device (A), including beginning receipt of new packets at said packet switching device (B);
means for thereafter reprogramming said packet switching device (A), including retrieving new packet processing software from a remote location; and
means for thereafter de-activating said packet switching device (B) and re-activating said packet switching device (A).

35. The router of claim 34 further comprising:
means for reprogramming said packet switching device (B) prior to activating said packet switching device (B).

36. The router of claim 35 wherein reprogramming comprises retrieving new packet processing software from a remote location.

37. The router of claim 34 further comprising:
means for operating said packet switching device (A) as a back-up after de-activating said packet switching device (A).

38. The method of claim 34 wherein said protocol state information comprises register values.

* * * * *

UNITED STATES PATENT AND TRADEMARK OFFICE
CERTIFICATE OF CORRECTION

PATENT NO. : 7,610,405 B1  
APPLICATION NO. : 10/825850  
DATED : October 27, 2009  
INVENTOR(S) : Moberg et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1593 days.

Signed and Sealed this

Twelfth Day of October, 2010

David J. Kappos  
*Director of the United States Patent and Trademark Office*